(12) United States Patent
Cunkelman et al.

(10) Patent No.: US 6,286,997 B1
(45) Date of Patent: Sep. 11, 2001

(54) TEMPERATURE INDICATOR FOR USE IN A PRESSURIZED ENVIRONMENT

(75) Inventors: Brian L. Cunkelman, Blairsville; Jennifer L. Ray, Ruffsdale, both of PA (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/189,210

(22) Filed: Nov. 10, 1998

(51) Int. Cl.[7] .................................................. G01K 11/00
(52) U.S. Cl. ........................................................... 374/160
(58) Field of Search ................................... 374/106, 141, 374/147–8, 195, 155, 160

(56) References Cited

U.S. PATENT DOCUMENTS

| | | | |
|---|---|---|---|
| 4,082,000 | * 4/1978 | Volk et al. | 73/358 |
| 4,289,088 | * 9/1981 | Scibelli | 116/218 |
| 4,356,790 | * 11/1982 | Gee | 374/155 |
| 4,421,053 | * 12/1983 | Volk | 374/155 |
| 4,748,931 | * 6/1988 | Volk | 374/160 |
| 5,487,352 | * 1/1996 | Williams et al. | 374/160 |
| 5,799,606 | * 9/1998 | Volk et al. | 374/160 |
| 5,988,102 | * 11/1999 | Volk et al. | 374/160 |

* cited by examiner

Primary Examiner—Thomas N. Moulis
(74) Attorney, Agent, or Firm—James Ray & Associates

(57) ABSTRACT

A temperature indicator for providing a visual indication that a pressurized fluid has exceeded a specified temperature. Such pressurized fluid being contained within a container bounded by a container wall. Such container wall being provided with an aperture for mounting of the temperature indicator therein such that the temperature indicator protrudes through such aperture and into such pressurized fluid contained within such container. The temperature indicator includes a housing member, a cavity provided in the housing member and a bore extending from an interior portion of the cavity to an exterior surface of the housing member. The exterior surface of the housing member is visible from a position external of such container when the temperature indicator is mounted in such aperture such that the temperature indicator protrudes through such aperture and into such pressurized fluid contained within such container. The temperature indicator further includes a plunger member at least partially disposed within the cavity. The plunger member extends into the bore and a bonding agent bonds the plunger member to the housing member. The bonding agent being substantially exposed to such pressurized fluid contained within such container and the bonding agent being thermosensitive to substantially release the bonding of the plunger member to the housing member upon the bonding agent substantially exceeding the specified temperature.

18 Claims, 2 Drawing Sheets

TEMPERATURE INDICATOR FOR USE IN A PRESSURIZED ENVIRONMENT

CROSS-REFERENCE TO RELATED APPLICATIONS

The present application relates to similar subject matter as is disclosed in U.S. patent application Ser. No. 09/189,212, filed contemporaneously herewith by Brian L. Cunkelman and Jennifer Ray and entitled "Pop-Up Temperature Indicator", and in U.S. patent application Ser. No. 09/189, 209, filed contemporaneously herewith by Brian L. Cunkelman and Jennifer Ray and entitled "Temperature Activated Diversion Valve", both of these copending patent applications being assigned to the same assignee as the present application and both of these copending applications being incorporated herein by reference thereto.

BACKGROUND OF THE INVENTION

1. Field of the Invention

The present invention relates, in general, to the field of temperature indicators and, more particularly, this invention relates to an apparatus for determining whether the temperature of a pressurized fluid contained in a container (or flowing through a conduit) has, at some previous time, exceeded a specified temperature. Even more particularly, the present invention relates to an apparatus for indicating whether the temperature of a gas (e.g., air) within a container or conduit has exceeded such a specified temperature. The present invention is seen to have particular application to determining whether air flowing in a conduit between a low pressure cylinder and a high pressure cylinder of a two-stage air compressor having an integral intercooler provided therebetween has exceeded a specified temperature.

2. Description of the Related Art

As is generally well known in the art, fluids at elevated temperatures are present in many types of processes and apparatuses and keeping the fluids within particular temperature ranges can be essential to a proper functioning of these processes and apparatuses. The fluid having exceeded, at some prior time, a specified temperature can possibly indicate a malfunction which should be investigated.

As is explained more fully below, a well known air compressor unit employed extensively in the rail transportation industry uses a two-stage compression, with air from a low compression cylinder passing through an integrally provided intercooler prior to introduction into a high compression cylinder. At least a portion of the air may be routed so as to bypass the intercooler, particularly upon initial startup, to prevent the air introduced into the high pressure cylinder from being "overcooled", which can create problems due to excess condensation forming in the intercooler.

The amount of air which is actually routed through the intercooler in such a case may be controlled via a thermostatic control system. Excess temperature of the air passing through the conduit leading from the intercooler to the high pressure cylinder can be indicative of a malfunctioning of such a thermostatic control system.

OBJECTS OF THE INVENTION

Accordingly, one object of the present invention is the provision of a temperature indicator for indicating whether a pressurized fluid contained in a container (or flowing through a conduit) has, at some previous time, exceeded a specified temperature.

Another object of the present invention is the provision of such a temperature indicator which is simple in construction and therefore inexpensive to manufacture, while still being reliable in operation.

A further object of the present invention is the provision of such a temperature indicator particularly adapted for monitoring the temperature of a gas (most particularly air) flowing in a conduit between a low pressure cylinder and a high pressure cylinder of a two-stage type air compressor unit having an intercooler interposed between the low and high pressure cylinders, the air compressor unit preferably utilizing a thermostatically controlled bypass mechanism for the intercooler.

In addition to the objects and advantages of the present invention described above, various other objects and advantages of the invention will become more readily apparent to those persons skilled in the relevant art from the following more detailed description of the invention, particularly, when such description is taken in conjunction with the attached drawing Figures and with the appended claims.

SUMMARY OF THE INVENTION

In one aspect, the invention generally features a temperature indicator for providing a visual indication that a pressurized fluid has exceeded a specified temperature. Such pressurized fluid being contained within a container bounded by a container wall and such container wall being provided with an aperture for mounting of the temperature indicator therein such that the temperature indicator protrudes through such aperture and into such pressurized fluid contained within such container. The temperature indicator includes a housing member, a cavity provided in the housing member and a bore extending from an interior portion of the cavity to an exterior surface of the housing member. The exterior surface of the housing member is visible from a position external of such container when the temperature indicator is mounted in such aperture such that the temperature indicator protrudes through such aperture and into such pressurized fluid contained within such container. The temperature indicator further includes a plunger member at least partially disposed within the cavity. The plunger member extends into the bore and a bonding agent bonds the plunger member to the housing member. The bonding agent is substantially exposed to such pressurized fluid contained within such container and the bonding agent being thermosensitive to substantially release the bonding of the plunger member to the housing member upon the bonding agent substantially exceeding the specified temperature.

In another aspect, the invention generally features a temperature indicator disposed to monitor a temperature of a fluid flowing in a two-stage type air compressor. The two-stage air compressor includes a low pressure cylinder for compressing such fluid to a first pressure, a high pressure cylinder for compressing such fluid to a second pressure greater than the first pressure and an intercooler for receiving such fluid from the low pressure cylinder at the first pressure and for providing such fluid to the high pressure cylinder. The intercooler has a mechanism for substantially cooling such fluid received from the low pressure cylinder and a conduit for transferring such fluid from the intercooler to the high pressure cylinder. The temperature indicator is mounted on the conduit to monitor a temperature of such fluid passing through the conduit and includes a housing member, a cavity provided in the housing member and a bore extending from an interior portion of the cavity to an exterior surface of the housing member. The exterior surface of the housing member being visible from a position external of the conduit. The temperature indicator also includes a plunger member at least partially disposed within the cavity. The plunger member extends into the bore and a bonding agent bonds the plunger member to the housing member. The bonding agent being substantially exposed to such fluid contained within the conduit and the bonding agent being thermosensitive to substantially release the bonding of the plunger member to the housing member upon the bonding agent substantially exceeding a specified temperature.

In a yet further aspect, the invention generally features a temperature indicator for providing a visual indication that a pressurized fluid has exceeded a specified temperature. The temperature indicator includes a housing member, a cavity provided in the housing member and a bore extending from an interior portion of the cavity to an exterior surface of the housing member. A plunger member is at least partially disposed within the cavity and the plunger member extends into the bore. A bonding agent bonds the plunger member to the housing member. The bonding agent being thermosensitive to substantially release the bonding of the plunger member to the housing member upon substantial exposure of the bonding agent to a temperature substantially exceeding the specified temperature.

The present invention will now be described by way of a particular preferred embodiment, reference being had to the accompanying drawing, wherein:

DETAILED DESCRIPTION OF THE PREFERRED EMBODIMENT

Figure 1:
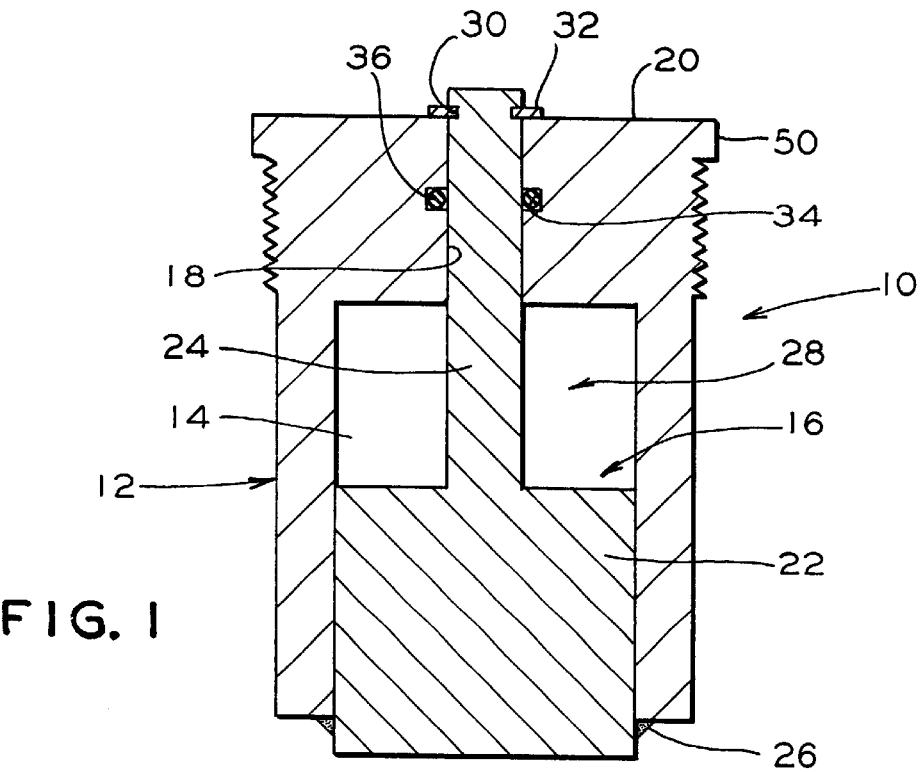
FIG. 1 is a cross-sectional view of a preferred embodiment of a temperature indicator constructed according to the present invention.

Prior to proceeding to the more detailed description of the invention, it should be noted that identical components having identical functions have been identified with identical reference numerals throughout the several views illustrated in the drawing figures for the sake of clarity and understanding of the instant invention.

Referring first most particularly to FIG. 1, in the present particularly preferred embodiment, a temperature indicator, generally designated 10 and constructed according to the present invention, includes a housing member 12, a cavity 14 formed within the housing member 12 and a plunger member 16 disposed within the cavity 14 of the housing member 12. A bore 18 extends from the cavity 14 to an exterior surface 20 of the housing member 12. The plunger member 16 includes a piston portion 22 disposed within the cavity 14 and a stem portion 24 which extends outwardly from the piston portion 22 and into the bore 18.

A bonding agent 26 bonds the plunger member 16 to the housing member 12. Preferably, in the first configuration shown in FIGS. 1 and 2, the piston portion 22 of the plunger member 16 extends a relatively short distance beyond the housing member 12 and the bonding agent 26 is preferably deposited in the form of a fillet of bonding material which encircles the piston portion 22, thus being adjacent and adhering to both the piston portion 22 and the housing member 12.

The bonding agent 26 is a "thermosensitive" bonding agent, in the sense that the bonding agent 26 maintains a bond between the piston portion 22 and the housing member 12 and maintains them in the configuration shown in FIGS. 1 and 2, namely the first configuration, so long as the temperature of the bonding agent 26 remains below the specified design temperature. Once the bonding agent 26 substantially reaches the specified design temperature, however, the bonding of the piston portion 22 of the plunger member 16 to the housing member 12 is substantially released, thereby freeing the plunger member 16 for movement with respect to the housing member 12.

The bonding agent 26 preferably includes Indium (In). Even more preferably, the bonding agent 26 is an Indium alloy. Indium and Indium alloys can be employed as thermosensitive bonding agents that melt and undergo a substantial reduction in bonding force upon reaching specified temperatures. Such Indium based bonding agents are available from a variety of sources, for example, Indium Corporation of America®.

The cavity 14 of the housing member 12 generally forms a cylinder portion 28, the piston portion 22 of the plunger member 16 mating therewith to permit a sliding coaxial movement therebetween. Preferably, the cylinder portion 28 and the piston portion 22 are both of substantially circular cross section. However, it will be apparent that other cross-sectional shapes can be readily substituted while still maintaining the coaxial sliding function, e.g., hexagonal or square cross-sectional shapes.

As is more fully explained below, the temperature indicator 10 has particular application to monitoring the temperature of a pressurized fluid. To prevent a complete separation of the housing member 12 and the plunger member 16 following release by the bonding agent 26 and a subsequent depressurization of the monitored fluid, in the first configuration shown in FIG. 1, the stem portion 24 of the plunger member 16 extends a relatively short distance beyond the exterior surface 20 of the housing member 12. The stem portion 24 is provided with an encircling groove 30 into which fits a so-called "snap ring" 32.

To prevent any escape of pressurized fluid through the temperature indicator 10, the wall of the bore 18 is provided with a groove 34. A flexible sealing element 36, preferably an O-ring, encircles the stem portion 24 of the plunger member 16 and is disposed within the groove 34. Preferably, the flexible sealing element 36 is formed from a high-temperature resistant resilient material such as Viton® or silicone, etc.

Figure 2:
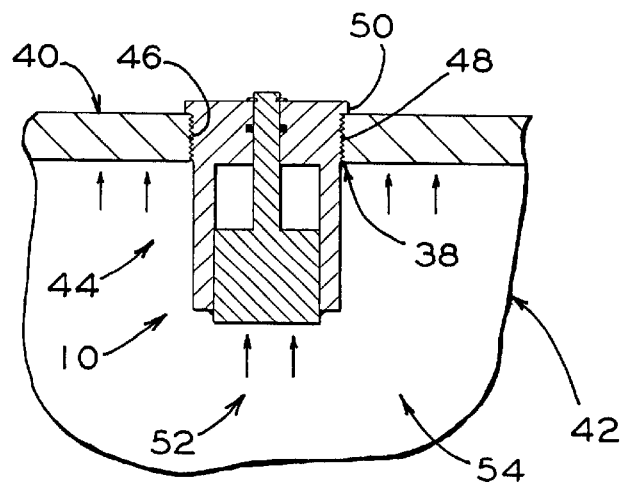
FIG. 2 is a cross-sectional view of the inventive temperature indicator of FIG. 1 mounted in an aperture provided in a container wall of a container (or in a conduit wall of a conduit), showing the inventive temperature indicator in a first configuration wherein it has not been exposed to a temperature exceeding a specified design temperature.
Figure 3:
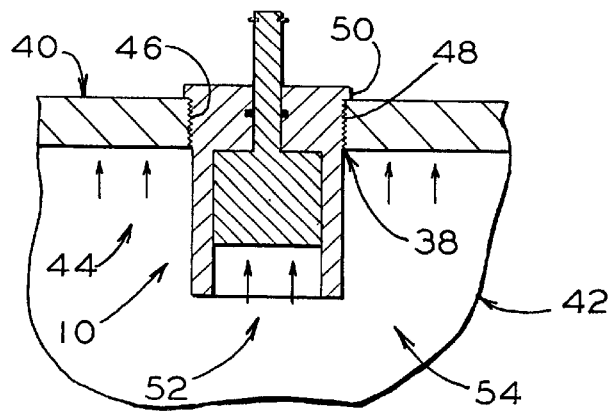
FIG. 3 is a cross-sectional view of the inventive temperature indicator mounted in the aperture of the container wall (or the conduit wall), similar to FIG. 2, but showing the inventive temperature indicator in a second configuration, wherein it has been exposed to a temperature exceeding the specified design temperature.

FIGS. 2 and 3 show the inventive temperature indicator 10 mounted within an aperture 38 provided in a container wall 40 of a container 42 which encloses a fluid 44. The aperture 38 is, preferably, provided with a female threaded tap 46 which engages a threaded portion 48 provided on the outside surface of the housing member 12 to form a mechanism for removably mounting the temperature indicator 10 within the aperture 38. In addition, the housing member 12 will, preferably, include a wrench engagable portion 50, thereby allowing the temperature indicator 10 to be threaded into and removed from the aperture 38. Preferably, the wrench engagable portion 50 is provided in the form of a hexagonal bolt head formed on the housing member 12. However, other well known torque transmitting structures (e.g., a slotted configuration for accepting a screwdriver blade, etc.) can easily be substituted therefor.

When mounted in the aperture 38, the temperature indicator 10 projects into the container 42 and into the pressurized fluid 44 contained therein. In this manner, the bonding agent 26 is directly exposed to and in contact with the pressurized fluid 44 and the pressurized fluid 44 can exert an outwardly directed force on an exposed face of the plunger member 16. If the pressurized fluid 44 has never exceeded the specified design temperature, the bonding agent 26 restrains the plunger member 16 from outward movement under the force of the pressurized fluid 44, and the temperature indicator 10 maintains the first configuration shown in FIGS. 1 and 2.

If, on the other hand, the pressurized fluid 44 has at some previous time exceeded the specified design temperature, then the restraining force exerted by the bonding agent 26 will be released, causing the plunger member 16 to move outward and assume the configuration shown in FIG. 3, whenever the fluid 44 is pressurized. Upon depressurization, the snap ring 32 prevents any complete disengagement of the plunger member 16 from the housing member 12.

In a presently preferred embodiment, the pressurized fluid 44 is a gas, and in one particularly preferred embodiment, the pressurized fluid 44 is air 52. In this particularly preferred embodiment, the temperature indicator 10 may be used to monitor the temperature of air passing through a conduit 54 of a two-stage type air compressor unit having at least one integral intercooler. Such an air compressor unit is manufactured by Westinghouse Air Brake Company and is referred to in the rail transportation industry as a "3-CD" Type Air Compressor.

Figure 4:
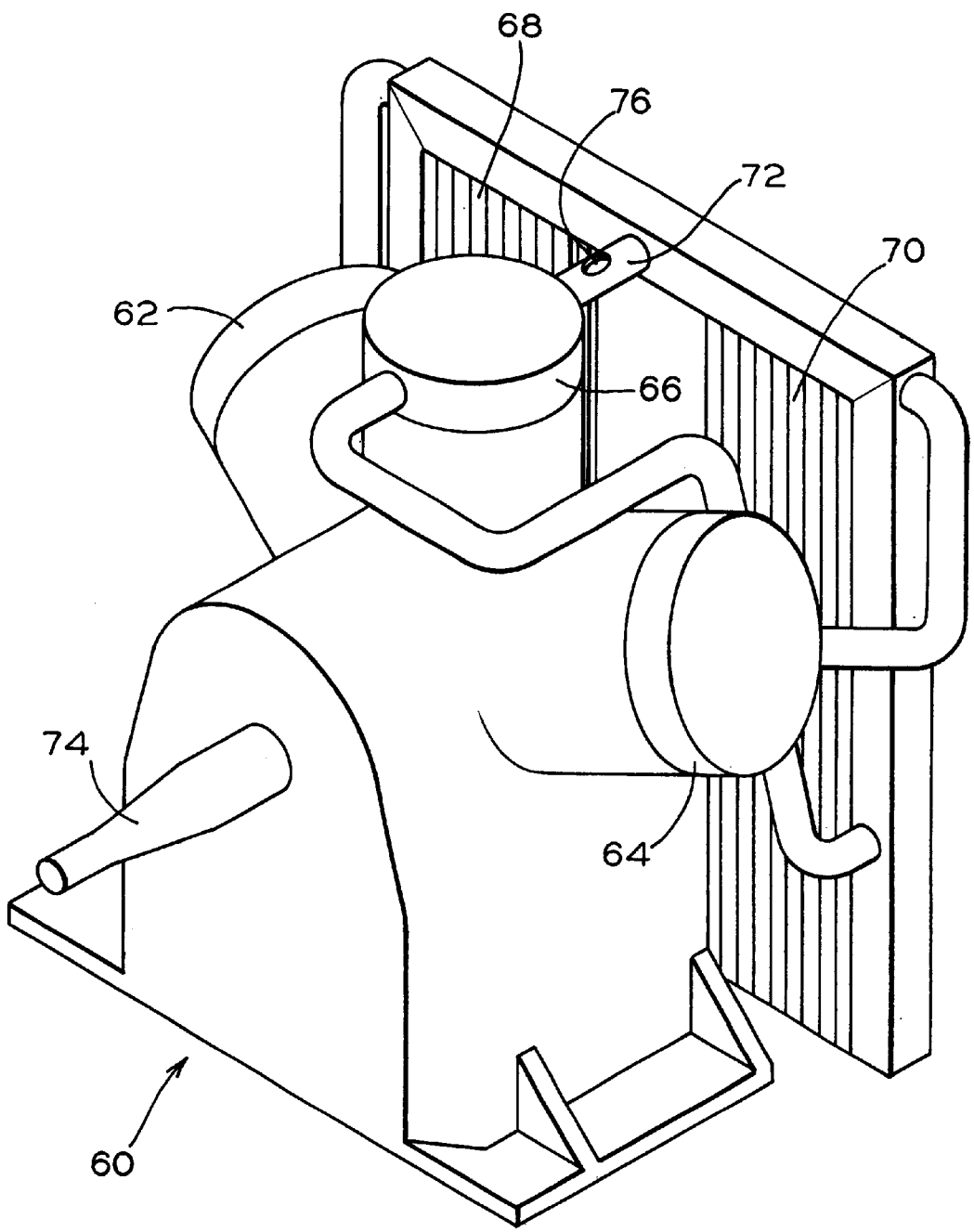
FIG. 4 is a simplified perspective view of a two-stage air compressor provided with integral intercoolers and having the present inventive temperature indicator mounted so as to monitor the temperature of air flowing in a conduit which transfers air from the intercoolers to the high pressure cylinder thereof.

Such a "3-CD" Type Air Compressor unit is illustrated in FIG. 4 and is further described in U.S. Pat. No. 5,106,270 issued to Goettel et al. Apr. 21, 1992 and in the publication entitled "Instructions for Disassembly, Repair and Assembly of '3-CD' Air Compressors", copyright 1994 by Westinghouse Air Brake Company, both this publication and U.S. Pat. No. 5,106,270 being hereby expressly incorporated by reference, with the same results as if their contents were fully set forth herein.

As shown in FIG. 4, a "3-CD" Type air compressor unit 60 generally includes a pair of low pressure or first stage air compression cylinders or stages 62 and 64, which intake filtered ambient air at the ambient atmospheric pressure and compress this air to a first elevated pressure, and a common high pressure or second stage air compression cylinder 66. As a result of the first stage of compression, the air exits the low pressure cylinders 62 and 64 at an elevated temperature. Rather than introduce the air exiting from the low pressure compression cylinders 62 and 64 directly into the high pressure cylinder 66, it has been found that more efficient compression is achieved by cooling the air between the first and second stages of compression.

To this end, the air compressor unit 60 is provided with a pair of intercooler elements 68 and 70, which receive the air exiting from the low pressure cylinders 62 and 64 and cool this air prior to its introduction into the high pressure cylinder 66. The cooled air exiting the intercoolers 68 and 70 is then introduced into and carried by a common conduit 72 to the high compression cylinder 66.

The air compressor unit 60 is powered through an input crankshaft 74, torque to which may be supplied via various mechanical linkages (e.g., belts and pulleys) by the power plant of the locomotive. However, it is becoming more common for torque to be supplied to the crankshaft 74 via so-called direct drive motors and to only activate the air compressor unit 60 and, therefore, the driving motor when required, i.e., "on demand". Thus, it is common for the air compressor unit 60 to be operated in a repeatedly start/stop pattern or cycle.

In such a cycle, following a start up phase, the air may be so cool upon exiting the intercoolers 68 and 70 that excess condensation is subsequently formed in the intercoolers 68 and 70, since the air at the resulting inter-stage pressure is not of a sufficiently elevated temperature to retain all of its moisture in the vapor phase. The formation of such condensation in the intercoolers 68 and 70 can have injurious results, for example, by leaking past the cylinder rings in the second or high pressure stage and into the crankcase lubricant.

Accordingly, it has been found highly desirable, particularly in the case wherein the air compressor unit 60 is operated on a start/stop basis, to provide a thermostatically controlled system for routing at least a portion of the air flow so as to bypass the intercoolers 68 and 70 for some period of time following start up. Such period of time being until the air exiting from these low pressure cylinders 62 and 64 has reached a determined minimum temperature, whereupon the intercoolers 68 and 70 are reintroduced into the flow route. One such system for thermostatically controlling the flow of air through the intercoolers 68 and 70, which is employed by the assignee of the present invention in conjunction with its "3-CD" Type air compressors, is generally referred to as a "Thermostatically Controlled Intercooler System", or "TCIS".

The temperature indicator 10 of the present invention finds a particularly preferred application when used in conjunction with a "3-CD" Type air compressor and an even more particularly preferred application when the "3-CD" Type air compressor is equipped with a Thermostatically Controlled Intercooler System (i.e., "TCIS") that controls the flow of air through the intercoolers 68 and 70 dependent upon its temperature.

Accordingly, in FIG. 4, reference numeral 76 indicates the presently preferred location for mounting of the inventive temperature indicator 10 on a common high pressure intake conduit 72 of a "3-CD" Type air compressor. When mounted at such location 76, the temperature indicator 10 of the present invention gives a readily determinable and easily visual indication whether the temperature of the air flowing in the common high pressure intake conduit 72 has, at some time, exceeded the specified design temperature and, thus, provides a good indication as to whether the Thermostatically Controlled Intercooler System ("TCIS")of the "3-CD" Type air compressor unit 60 has malfunctioned, indicating a need for further investigation and possible repair, for example, examination and possible replacement of a thermostat in the "TCIS".

When the present inventive temperature indicator 10 is used in conjunction with a "TCIS" equipped "3-CD" Type air compressor, it is presently preferred to use for the bonding agent 26 an Indium alloy commercially available from the Indium Corporation of America® under the designation Indalloy® Number 1E which has a melting point temperature of about 2240° F.

While the present invention has been described by way of a detailed description of a particularly presently preferred embodiment, it will be readily apparent to those of ordinary skill in the art that various substitutions of equivalents may be affected without departing from the spirit or scope of the invention as set forth in the appended claims.

What is claimed is:

1. A temperature indicator for providing a visual indication that a pressurized fluid has exceeded a specified temperature, such pressurized fluid being contained within a container bounded by a container wall, such container wall being provided with an aperture for mounting of said temperature indicator therein such that said temperature indicator protrudes through such aperture and into such pressurized fluid contained within such container, said temperature indicator comprising:

a housing member;

a cavity provided in said housing member;

a bore extending from an interior portion of said cavity to an exterior surface of said housing member, said exterior surface of said housing member being visible from a position external of such container when said temperature indicator is mounted in such aperture such that said temperature indicator protrudes through such aperture and into such pressurized fluid contained within such container;

a plunger member at least partially disposed within said cavity, said plunger member extending into said bore; and a bonding agent bonding said plunger member to said housing member, said bonding agent being substantially directly in contact with such pressurized fluid contained within such container and said bonding agent being thermosensitive to substantially release said bonding of said plunger member to said housing member upon said bonding agent substantially exceeding said specified temperature;

said cavity of said housing member including a cylinder portion;

said plunger member including a piston portion and a stem portion extending outwardly from said piston portion and into said bore;

said piston portion being slidingly mated within said cylinder portion to provide coaxial movement with respect thereto;

said plunger member having a pressurized surface;

said pressurized surface of said plunger member being pressurized by direct contact with such pressurized fluid contained within such container; and said plunger member moving within said bore toward said exterior surface of said housing member, upon said substantial release of said plunger member by said bonding agent, under a force caused by such pressurized fluid contained within such container acting on said pressurized surface of said plunger member.

2. A temperature indicator, according to claim 1, wherein said temperature indicator has at least two configurations, a first configuration indicating substantial non-exposure of said bonding agent to such pressurized fluid at a temperature substantially exceeding said specified temperature and said stem portion of said plunger member extends a first distance beyond said exterior surface of said housing member in said first configuration and a second configuration indicating exposure of said bonding agent to such pressurized fluid at a temperature substantially exceeding said specified temperature and said stem portion of said plunger extends a second distance beyond said exterior surface of said housing member in said second configuration and said second distance is substantially greater than said first distance.

3. A temperature indicator, according to claim 1, said temperature indicator additionally includes a means for preventing disengagement of said plunger member from said housing member.

4. A temperature indicator, according to claim 3, wherein said means for preventing said disengagement includes a snap ring engaging said stem portion of said plunger member at a position exterior of said housing member.

5. A temperature indicator, according to claim 1, said temperature indicator additionally includes a means for providing a fluid tight seal between said bore and said stem portion disposed within said bore.

6. A temperature indicator, according to claim 5, wherein said means for providing said fluid tight seal is an O-ring.

7. A temperature indicator, according to claim 1, wherein said cylinder portion and said piston portion are each of substantially circular cross section.

8. A temperature indicator, according to claim 1, wherein said temperature indicator additionally includes a mounting means for mounting said temperature indicator within such aperture provided in such container wall such that said temperature indicator protrudes through such aperture and into such pressurized fluid contained within such container.

9. A temperature indicator, according to claim 2, wherein said piston portion of said plunger member extends beyond said housing member in said first configuration and said bonding agent is disposed as a fillet shaped deposition adjacent both of said piston portion of said plunger member and said housing member.

10. A temperature indicator, according to claim 5, wherein said bonding agent includes at least one of Indium and an Indium alloy and said fluid tight seal includes a material selected from the group consisting essentially of Viton® and silicone.

11. A temperature indicator, according to claim 8, wherein such aperture includes a female threaded tap provided through such container wall and wherein said mounting means includes a threaded portion engagable with such female threaded tap and disposed on said housing member and a wrench engagable portion disposed on said housing member.

12. A temperature indicator, according to claim 1, wherein such container is a conduit and said bonding agent includes an Indium alloy having a melting temperature substantially equal to about 224° F.

13. A temperature indicator, according to claim 1, wherein such fluid is a gas.

14. A temperature indicator, according to claim 13, wherein such gas is air.

15. In combination, a temperature indicator disposed to monitor a temperature of a fluid flowing in a two-stage type air compressor wherein such two-stage air compressor includes a low pressure cylinder for compressing such fluid to a first pressure and a high pressure cylinder for compressing such fluid to a second pressure greater than such first pressure and an intercooler for receiving such fluid from such low pressure cylinder at such first pressure and for providing such fluid to such high pressure cylinder, such intercooler including means for substantially cooling such fluid received from such low pressure cylinder and a conduit for transferring such fluid from such intercooler to such high pressure cylinder, said conduit containing such fluid in a pressurized state and said temperature indicator being mounted on such conduit to monitor a temperature of such fluid in a pressurized state passing through such conduit, the improvement comprising said temperature indicator including:

a housing member;

a cavity provided in said housing member;

a bore extending from an interior portion of said cavity to an exterior surface of said housing member, said exterior surface of said housing member being visible from a position external of said conduit;

a plunger member at least partially disposed within said cavity, said plunger member extending into said bore; and a bonding agent bonding said plunger member to said housing member, said bonding agent being substantially directly in contact with such fluid in a pressurized state contained within said conduit and said bonding agent being thermosensitive to substantially release said bonding of said plunger member to said housing member upon said bonding agent substantially exceeding a specified temperature;

said cavity of said housing member including a cylinder portion;

said plunger member including a piston portion and a stem portion extending outwardly from said piston portion and into said bore; said piston portion of said plunger member being slidingly mated within said cylinder portion to provide coaxial movement with respect thereto;

said plunger member having a pressurized surface;

said pressurized surface of said plunger member being pressurized by direct contact with such fluid in a pressurized state within such conduit; and said plunger member moving within said bore toward said exterior surface of said housing member, upon said substantial release of said plunger member by said bonding agent, under a force caused by such fluid in a pressurized state within such conduit acting on said pressurized surface of said plunger member.

16. A temperature indicator, according to claim 15, wherein said conduit includes a conduit wall provided with an aperture therethrough and said temperature indicator protrudes through said aperture and into said conduit so as to contact such fluid in a pressurized state passing through said conduit and said temperature indicator has at least two configurations, a first configuration indicating substantial non-exposure of said bonding agent to a temperature substantially exceeding said specified temperature and in which said stem portion of said plunger member extends no more than a first distance beyond said exterior surface of said housing member in said first configuration and a second configuration indicating substantial exposure of said bonding agent to a temperature substantially exceeding said specified temperature and in which said stem portion of said plunger extends a second distance beyond said exterior surface of said housing member in said second configuration and said second distance being substantially greater than said first distance.

17. A temperature indicator, according to claim 16, wherein said temperature indicator additionally includes a means for preventing disengagement of said plunger member from said housing member and a means for providing a fluid tight seal between said bore and said stem portion disposed within said bore and said bonding agent includes at least one of Indium and an Indium alloy.

18. A temperature indicator, according to claim 17, wherein said cylinder portion and said piston portion are each of substantially circular cross section and said means for preventing said disengagement includes a snap ring engaging said stem portion of said plunger member at a position exterior of said housing member and said means for providing said fluid tight seal includes an O-ring and said temperature indicator additionally includes a mounting means for mounting said temperature indicator within said aperture provided in said conduit wall such that said temperature indicator protrudes through said aperture and into said conduit so as to contact such fluid passing through said conduit and said piston portion of said plunger member extends beyond said housing member in said first configuration and said bonding agent is disposed as a fillet shaped deposition adjacent both of said piston portion of said plunger member and said housing member, said bonding agent includes an Indium alloy having a melting temperature of substantially about 224° F. and said fluid tight seal includes a material selected from the group consisting essentially of Viton® and silicone and said aperture includes a female threaded tap provided through said conduit wall and said mounting means includes a threaded portion engagable with said female threaded tap and disposed on said housing member and a wrench engagable portion disposed on said housing member.

\* \* \* \* \*